(12) United States Patent
Yaguchi

(10) Patent No.: US 8,516,431 B2
(45) Date of Patent: Aug. 20, 2013

(54) RULE CHECK SYSTEM, DESIGN RULE CHECK METHOD AND DESIGN RULE CHECK PROGRAM

(75) Inventor: Takahiro Yaguchi, Tokyo (JP)

(73) Assignee: NEC Informatec Systems, Ltd., Tokyo (JP)

(*) Notice: Subject to any disclaimer, the term of this patent is extended or adjusted under 35 U.S.C. 154(b) by 471 days.

(21) Appl. No.: 12/764,481

(22) Filed: Apr. 21, 2010

(65) Prior Publication Data

US 2010/0275172 A1   Oct. 28, 2010

(30) Foreign Application Priority Data

Apr. 23, 2009  (JP) ................................. 2009-104748

(51) Int. Cl.
*G06F 17/50* (2006.01)
(52) U.S. Cl.
USPC ............................ 716/136; 716/113; 716/126
(58) Field of Classification Search
USPC ......................................... 716/113, 126, 136
See application file for complete search history.

(56) References Cited

U.S. PATENT DOCUMENTS 7,086,018 B2 *   8/2006  Ito .................................. 716/112
8,112,724 B2 *   2/2012  Izuha .............................. 716/50

FOREIGN PATENT DOCUMENTS

| JP | 3-118665 | 5/1991 |
| JP | 7-152824 | 6/1995 |
| JP | 10-198708 | 7/1998 |
| JP | 2000-259694 | 9/2000 |
| JP | 2001-165974 | 6/2001 |
| JP | 2002-197135 | 7/2002 |
| JP | 2007-292983 | 11/2007 |

OTHER PUBLICATIONS

Office Action issued Jan. 15, 2013 by the Japanese Patent Office in counterpart Japanese Patent Application No. 2009-104748 with English translation of pertinent portion enclosed in a wavy line, 4 pages.

* cited by examiner

*Primary Examiner* — Thuan Do
(74) *Attorney, Agent, or Firm* — Young & Thompson

(57) ABSTRACT

A design rule check system includes: a design rule check unit that performs a design rule checks on wiring information which indicates a wiring pattern of a net on the basis of a design rule which includes a constraint condition of a wiring pattern; and a screening processing unit which generates information about an error for each clock frequency of each net based on a result of the design rule check and outputs the information to an indicating device.

3 Claims, 5 Drawing Sheets

FIG.2

400 SCREENING TABLE

|  | f≧100 | | 100>f≧10 | | 10>f | |
|---|---|---|---|---|---|---|
| DRC1 | 10 | ☑ | 1 | ☐ | 1 | ☐ |
| DRC2 | 1 | ☑ | 11 | ☑ | 5 | ☑ |
| DRC3 | 0 | ☑ | 8 | ☐ | 0 | ☐ |
| DRC4 | 2 | ☑ | 1 | ☑ | 0 | ☐ |

| NET IDENTIFIER | DESIGN RULE CHECK ITEM | CLOCK FREQUENCY |
|---|---|---|
| net 001 | DRC1, DRC2 | 100MHz |
| net 008 | DRC2, DRC4 | 50MHz |
| net 014 | DRC1 | 100MHz |
| net 022 | DRC2 | 1MHz |
| : | : | : |

RULE CHECK SYSTEM, DESIGN RULE CHECK METHOD AND DESIGN RULE CHECK PROGRAM

This application is based upon and claims the benefit of priority from Japanese Patent Application No. 2009-104748, filed on Apr. 23, 2009, the disclosure of which is incorporated herein in its entirety by reference.

TECHNICAL FIELD

The present invention relates to a design rule check system, a design rule check method and a design rule check program.

BACKGROUND ART

An example of a design rule check system used for a design of a wiring pattern of a printed wiring board and an IC (Integrated Circuit) package is disclosed in Japanese Patent Application Laid-Open No. 1991-118665. In a design rule check system described in Japanese Patent Application Laid-Open No. 1991-118665, wiring pattern information, wiring restriction information and substrate information is inputted, and a check result list and a not-connected section list are outputted. That is, the design rule check system reads design data of a printed wiring board, then, detects design data portions which do not satisfy a designated threshold value and generates contents thereof, for each design rule check item that has been designated as a design rule in advance, and indicates those as an error message.

In the design rule check system mentioned above, when the number of design rule check items is large, or when a threshold value designated in each design rule check item is severe, there occurs a lot of cases where the design data do not satisfy threshold values (hereinafter, referred to as an error). In this case, it is impossible to correct all errors actually, and it is difficult to reflect every result of design rule checks into the design of a wiring pattern.

However, among design rule check items, there exist "items to which error correction is indispensable" and "items that do not need error correction necessarily".

As one of "items to which error correction is indispensable", there is a design rule check item about a manufacturing rule, for example. When an error occurs about such design rule check item, a designer of a printed wiring board or an IC package has to correct the error certainly.

On the other hand, as one of "items that do not need error correction necessarily", there is a design rule check item about EMI (Electro Magnetic Interference) reduction, for example. When an error occurs about such design rule check item, it is desired that the designer corrects the error as much as possible. For example, in design rule check items for EMI reduction, items having a high effectiveness for evading a EMI problem, and items having a low effectiveness for the problem are intermingled. A designer has to evaluate an effect when an error is corrected one by one on each of design rule check items that have the error, and then has to select a design rule check item to be corrected the error on the basis of the evaluation.

SUMMARY

The exemplary object of the present invention is to provide a design rule check system which can extract an error easily.

A design rule check system of the present invention includes: a design rule check unit that checks wiring information which indicates a wiring pattern of each net on the basis of a design rule which includes a constraint condition of a wiring pattern; and a screening processing unit which generates information about an error in the each net for each clock frequency of the each net based on a result of the design rule check and outputs said information to an indicating device.

A design rule check method of the present invention includes: checking a design rule on wiring information which indicates a wiring pattern of each net on the basis of a design rule which includes a constraint condition of a wiring pattern; and indicating information about an error in the each net for each clock frequency of the each net based on a result of the design rule check.

A storage medium of the present invention stores a program which makes a computer function as: a design rule check unit that checks wiring information which indicates a wiring pattern of each net on the basis of a design rule which of includes a constraint condition of a wiring pattern; and a screening processing unit which generates information about an error in said each net for each clock frequency of said each net based on a result of said design rule check and outputs said information to an indicating device.

BRIEF DESCRIPTION OF THE DRAWINGS

Exemplary features and advantages of the present invention will become apparent from the following detailed description when taken with the accompanying drawings in which:

FIG. 2 is a diagram showing a structure of a screening table 400 in the first exemplary embodiment of the present invention;

EXEMPLARY EMBODIMENT

Next, a detailed explanation will be given for a first exemplary embodiment with reference to the drawings.

The First Exemplary Embodiment

Next, the first exemplary embodiment of the present invention will be described in detail with reference to the drawings.

Figure 1:
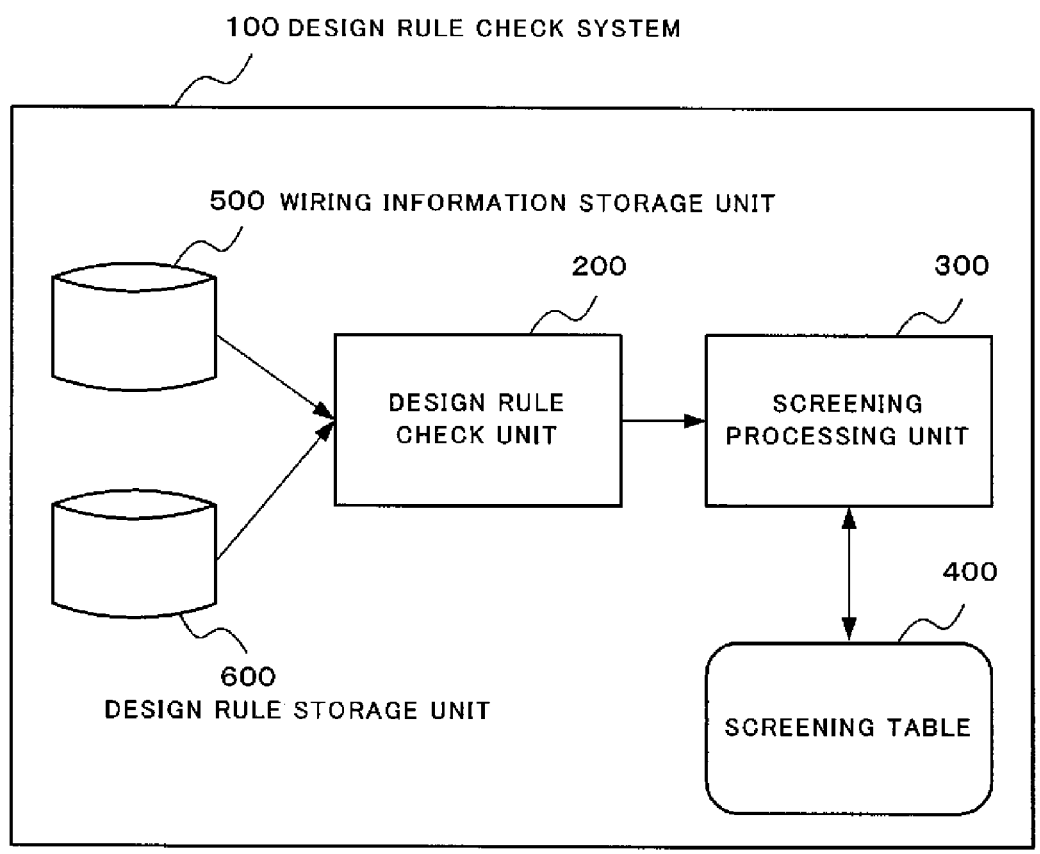
FIG. 1 is a block diagram of a design rule check system 100 in a first exemplary embodiment of the present invention.

FIG. 1 indicates a structure of the design rule check system 100 in the first exemplary embodiment of the present invention. Referring to FIG. 1, the design rule check system 100 according to the first exemplary embodiment of the present invention includes a design rule check unit 200, a screening processing unit 300, a screening table display device (hereinafter, referred to as a "screening table") 400, a wiring information storage unit 500 and a design rule storage unit 600.

The design rule check system 100 may be an information processing apparatus (computer) which operates based on a program stored in a storage medium.

The design rule check unit 200 performs a design rule check on wiring information 501 based on a design rule 601.

The screening processing unit 300 receives a result of the design rule check and control the screening table 400 to indicate or display the result. Specifically, the screening processing unit 300 carries out screening processing to the result of the design rule check and control to indicate the processing result on the screening table 400. Then, the screening processing unit 300 accepts a user's selection of a correction target which has an error.

The screening table 400 is a table which indicates the result of the design rule check to which the screening processing has been performed. FIG. 2 shows a structure of the screening table 400. Referring to FIG. 2, the screening table 400 includes a display part 411 which indicates a design rule check item (DRC1, DRC2, DRC3, DRC4), a display part 412 which indicates a clock frequency, a display part 413 (4×3 parts in FIG. 2) which indicates the number of design-rule-check-error nets, a selector 414 (square check areas in each of 4×3 parts in FIG. 2) for selecting a design rule check error, and a display part 415 which indicates a design-rule-check-error list.

The wiring information storage unit 500 performs storage management of the wiring information 501 about a printed wiring board or an IC package. The wiring information storage unit 500 may include wiring information on both printed wiring boards and IC packages. The wiring information 501 is information indicating a wiring pattern of a wire connection (hereinafter, referred to as a net) between circuit elements and devices on a printed wiring board or an IC package. The wiring information 501 includes information such as a layer in which a wiring pattern is wired, a wiring position, a linewidth and a type of wiring (a signal wire, a power supply and a ground) about each net. The wiring information 501 also includes information on an operating frequency about each net.

The design rule storage unit 600 performs storage management of the design rule 601. The design rule 601 includes a constraint condition (a design rule check item) for the wiring pattern on the printed wiring board or the IC package. Here, each design rule check item has a threshold value about the width and the length of the wiring pattern and the distance between wiring patterns, for example. According to this embodiment, it is supposed that each design rule check item is a design rule check item about EMI reduction and is "an item that does not need error correction necessarily".

Next, operation of the first exemplary embodiment of the present invention will be described with reference to drawings.

Figure 3:
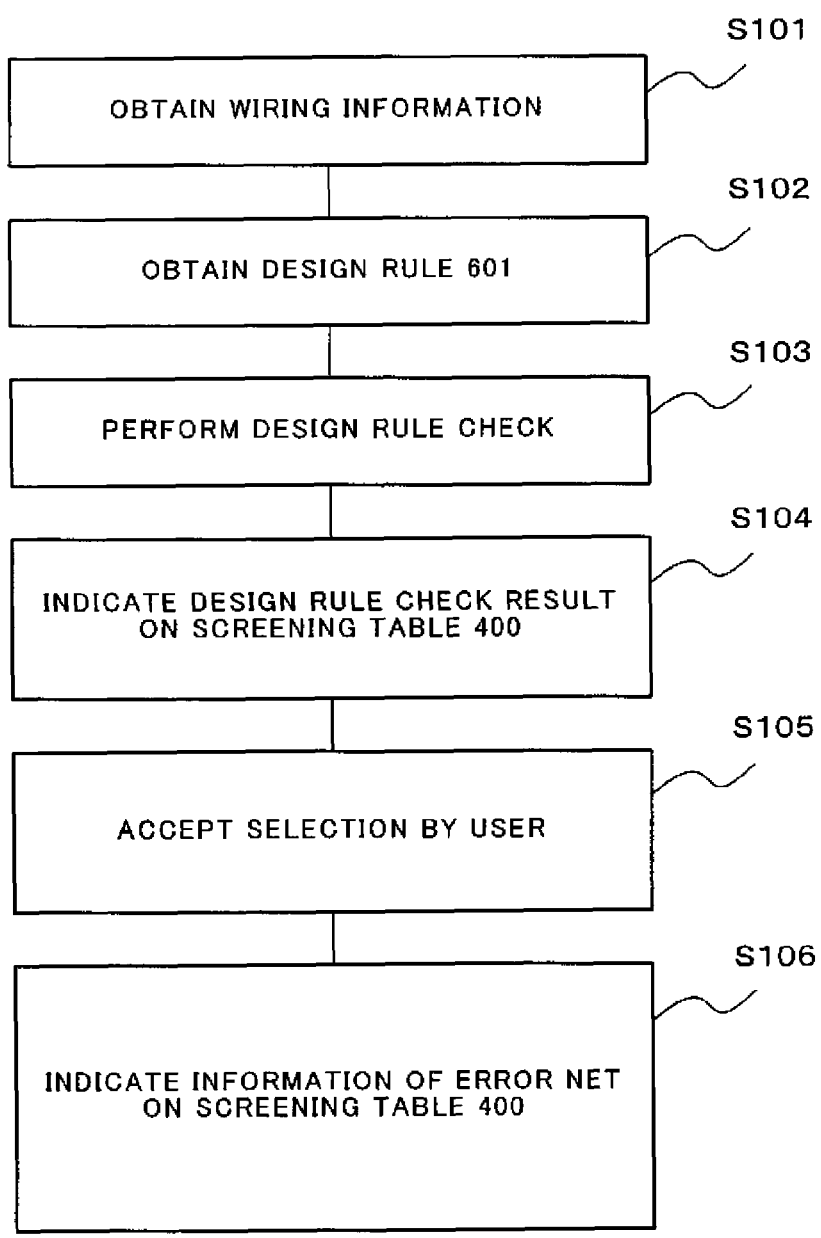
FIG. 3 is a flow chart showing operation of the first exemplary embodiment of the present invention.

FIG. 3 is a flow chart showing operation of the first exemplary embodiment of the present invention.

First, the design rule check unit 200 refers to the wiring information storage unit 500 and obtains or retrieves the wiring information 501 (Step S101).

The design rule check unit 200 refers to the design rule storage unit 600 and obtains or retrieves the design rule 601 (Step S102).

The design rule check unit 200 carries out the design rule check on the wiring information 501 based on the design rule 601 (Step S103). Here, the design rule check unit 200 compares information on the wiring pattern of each net included in the wiring information 501 with the threshold value of each design rule check item included in the design rule 601, and extracts a net which does not satisfy the threshold value (that is, which causes an error) about each of the design rule check item. Information on an extracted net corresponds to the result of the design rule check.

The screening processing unit 300 performs screening processing for the result of the design rule check, and outputs information about an error to display the information on the screening table 400 (Step S104). That is, the screening processing unit 300 retrieves an operating frequency of a net which has become an error based on the wiring information 501. Next, the screening processing unit 300 totals the number of nets which have become an error for each combination of the design rule check item and the operating frequency indicated on the screening table 400. As information about an error, the screening processing unit 300 outputs the number of design-rule-check-error nets associated with a corresponding design rule check item and an operating frequency to the screening table 400. As a result, the screening table 400 indicates the number of design-rule-check-error nets on the display part 413 as shown in FIG. 2.

For example, the screening table 400 indicates the number of error nets for each combination of design rule check items (DRC1, DRC2, DRC3 and DRC4) and operating frequencies (frequency f no smaller than 100 MHz, less than 100 MHz and no smaller than 10 MHz, and less than 10 MHz) as shown in FIG. 2.

Meanwhile, the screening table 400 may indicate, about a combination of design rule check items and operating frequencies, only a presence or absence of a net which has become an error instead of the number of nets which have become an error.

A user determines a combination of design rule check items and operating frequencies which will become a target of error correction based on indication of the screening table 400 and selects it using the design rule check error selector 414. Here, when the design rule check item is satisfied by correcting an error, an improvement effect to a problem to be improved for such design rule depends on the operating frequency of the net. For example, the improvement effect of the EMI reduction depends on a constraint condition of a wiring pattern designated by the design rule check item and the operating frequency. It is supposed that, about the combination of design rule check items and operating frequencies, the user knows information on the improvement effect beforehand. The user determines a combination of design rule check items and operating frequencies which becomes a subject of error correction based on information on such an improvement effect.

On the screening table 400, the screening processing unit 300 receives a selection input of the combination of the design rule check items and operating frequencies by the user (Step S105). The screening processing unit 300 changes indication of the design rule check error selector 414 into a selected state for the received combination.

About the combination of the selected design rule check item and operating frequency, the screening processing unit 300 outputs information related to a net which has become an error to the screening table 400. The screening table 400 indicates the information on the design-rule-check-error list display part 415 (Step S106).

For example, the screening processing unit 300 generates and outputs pieces of information (an identifier of a net, a design rule check item and tan operating frequency) about a net which has become an error as error list data while being associated with each other, and the screening table 400 indicates or displays the error lest data in the design-rule-check-error list display part 415 of FIG. 2.

The user corrects an error so that the threshold value of a design rule check item may be satisfied about a net indicated on the design-rule-check-error list display part 415.

By the above, operation of the first exemplary embodiment of the present invention is completed.

The above mentioned operation may be carried out by a computer based on a program stored in a storage medium.

According to the first embodiment of the present invention, in a design rule check system, there is the effect that a user can extract a serious error easily from a large number of errors which have occurred in a design rule check. The reason of this is that the screening processing unit 300 outputs information about an error for each operating frequency of each net based on a result of a design rule check, and indicates it on an indication device.

The Second Exemplary Embodiment

Next, the second exemplary embodiment of the present invention will be described in detail with reference to the drawings.

Figure 4:
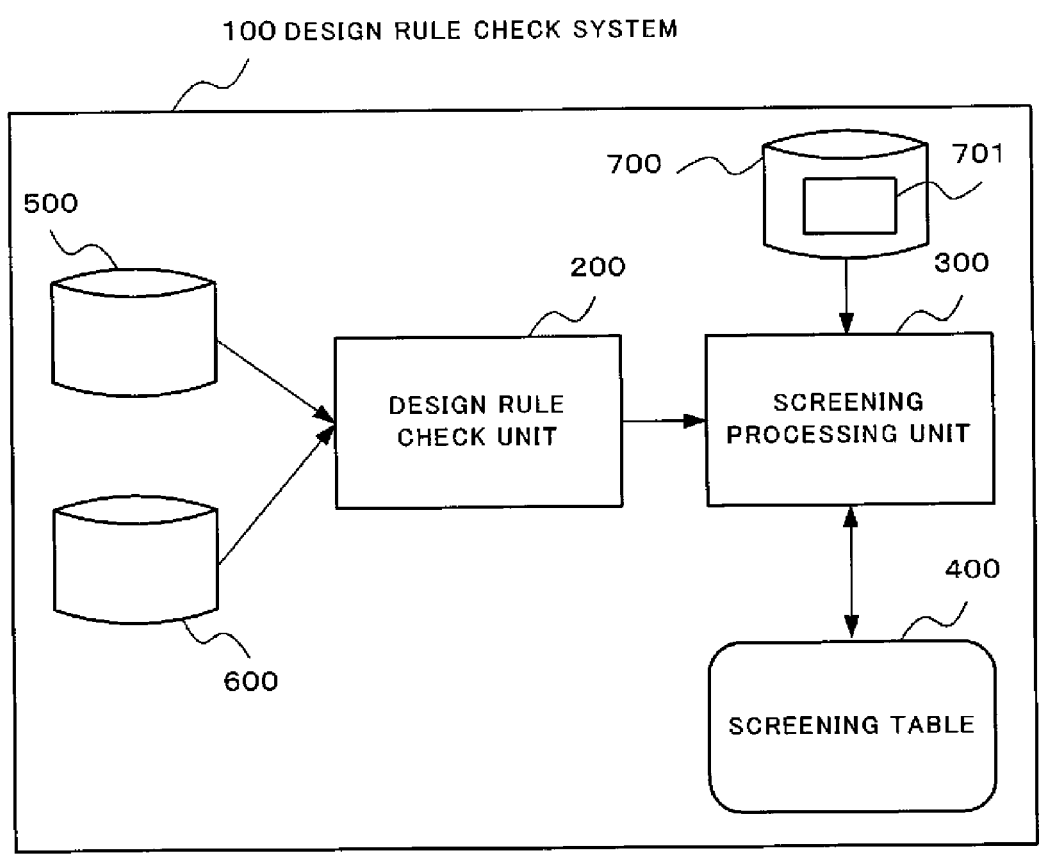
FIG. 4 is a block diagram of a design rule check system 100 in a second exemplary embodiment of the present invention.

FIG. 4 indicates a structure of a design rule check system 100 in the second exemplary embodiment of the present invention. Referring to FIG. 4, the design rule check system 100 in the second exemplary embodiment of the present invention includes an error selection default information storage section 700 in addition to the structure of the first exemplary embodiment.

The error selection default information storage section 700 performs storage management of error selection default information 701. The error selection default information 701 indicates information on combinations with a higher order of priority of error correction among combinations of design rule check items and operating frequencies on the screening table 400. Here, it is supposed that the error selection default information 701 includes combinations with a higher effect of EMI reduction as the higher order of priority of error correction.

Next, operation of the second exemplary embodiment of the present invention will be described with reference to the drawings.

Figure 5:
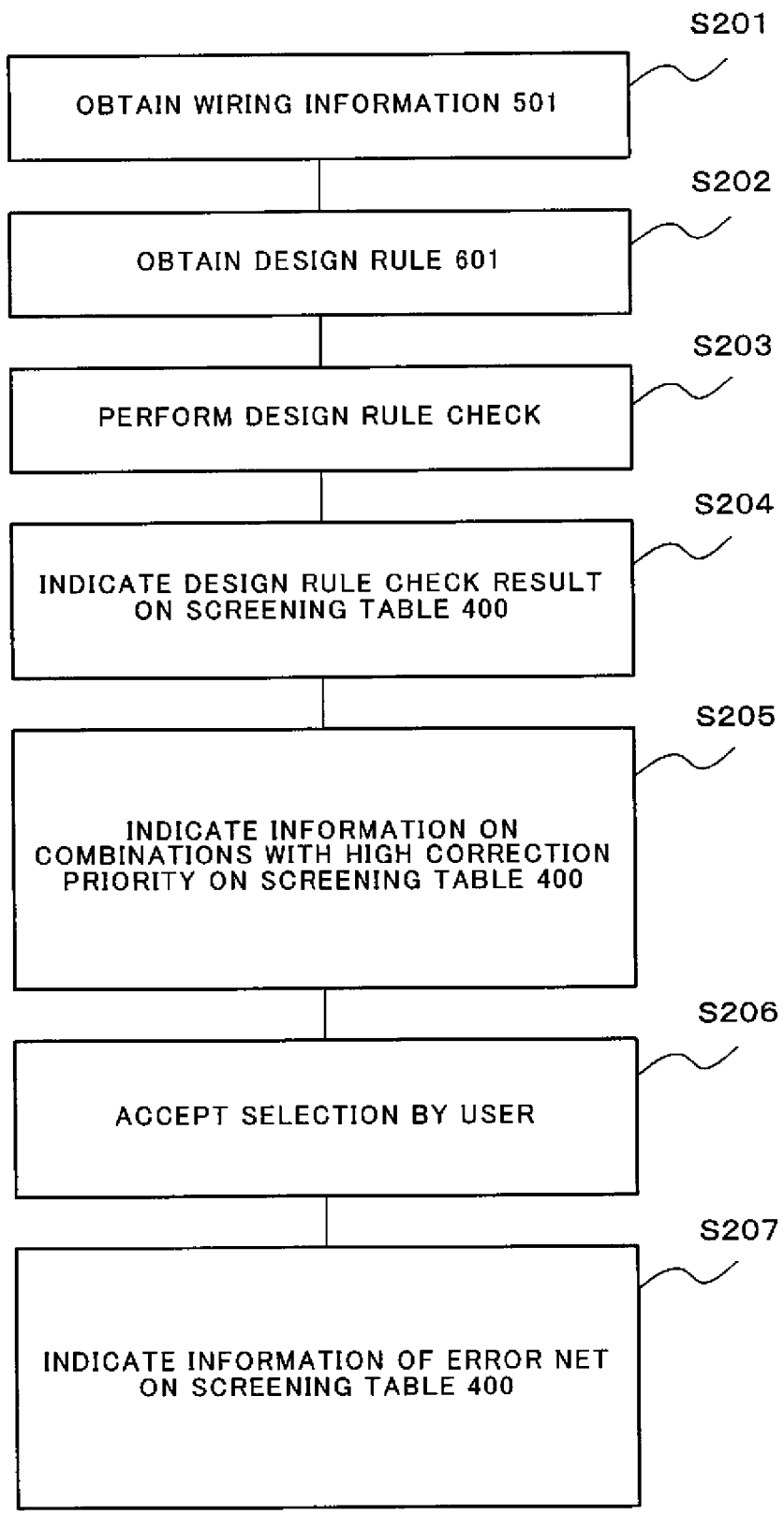
FIG. 5 is a flow chart showing operation of the second exemplary embodiment of the present invention.

FIG. 5 is a flow chart showing operation of the second exemplary embodiment of the present invention.

First, operation after the design rule check unit 200 reads the wiring information 501 and until the screening processing unit 300 control the screening table 400 to indicates the result of the design rule check on the screening table 400 (Steps S201 to S204) is similar to the first exemplary embodiment of the present invention (Steps S101 to S104).

Next, the screening processing unit 300 refers to the error selection default information 701 of the error selection default information storage unit 700, and selects the combination of the design rule check item and the operating frequency with a higher order of priority of error correction automatically (Step S205). At that time, the screening processing unit 300 changes the design rule check error selector 414 into the selected state for the selected combination of design rule check items and operating frequencies.

The screening processing unit 300 further accepts a selection of a combination of design rule check items and operating frequencies by a user on the screening table 400 (Step S206).

About the combinations of selected design rule check items and operating frequencies, the screening processing unit 300 indicates information on nets which have become an error on the screening table 400 (Step S207).

By the above, operation of the second exemplary embodiment of the present invention is completed.

According to the second exemplary embodiment of the present invention, even if a user is lacking in a skill about the improvement effect of a problem detected by a design rule, there is the effect that the user can extract a serious error more easily. The reason of this is that the screening processing unit 300 selects a combination of design rule check items and operating frequencies of a net based on the error selection default information 701.

In a design rule check system of related technology, a designer needs to select an error which should be corrected from a large number of errors which have occurred in a design rule check based on the effect when the error is corrected. Accordingly, there is a problem that long hours of work and a high skill is required.

In order to settle this problem, a design rule check system of the embodiment of the present invention includes: a design rule check unit that checks wiring information which indicates a wiring pattern of each net on the basis of a design rule which includes constraint condition of the wiring pattern; and a screening processing unit which outputs information about an error in a net for each clock frequency of the each net based on a result of the design rule check and outputs it to an indicating device.

The effect by this is that, in a design rule check system, it is possible to extract a serious error easily from a large number of errors which have occurred in a design rule check.

The present invention is applicable in a design using a design rule check of a printed wiring board and an IC package.

The previous description of the exemplary embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A design rule check system comprising:
a design rule check unit that performs a design rule check on the basis of wiring information relating to a wiring pattern of each net and a design rule which includes a constraint condition of a wiring pattern; and
a screening processing unit which generates error information about an error in said each net for each combination of design rule check items and operating frequencies of each net based on a result of said design rule check and outputs said error information to an indicating device;
wherein said screening processing unit outputs error list data of nets which have become an error about a selected combination of the check item of said design rule and operating frequency of said each net;
wherein said screening processing unit selects a combination of check items of said design rule and operating frequencies of said each net based on error selection default information which indicates a combination with a high priority of error correction among combinations of check items of said design rule and operating frequencies of said each net;
wherein said error selection default information is a combination with a high effect of EMI reduction among combinations of check items of said design rule and operating frequencies of said each net.

2. A method of a design rule check system comprising:
performing, at an information processing apparatus, a design rule check on the basis of wiring information a wiring pattern of each net and a design rule which includes a constraint condition of a wiring pattern;

generating, at the information processing apparatus, error information about an error in said each net for each combination of design rule check items and operating frequencies of said each net based on a result of said design rule check;

outputting, from the information processing apparatus, said error information to an indicating device;

outputting error list data of nets which have become an error about said selected combination of the check item of said design rule and operating frequency of said each net; and selecting a combination of check items of said design rule and operating frequencies of said each net based on error selection default information which indicates a combination with a high priority of error correction among combinations of check items of said design rule and operating frequencies of said each net;

wherein said error selection default information is a combination with a high effect of EMI reduction among combinations of check items of said design rule and operating frequencies of said each net.

3. A non-transitory computer-readable medium storing a program which makes a computer function as:

a design rule check unit that performs a design rule check on the basis of wiring information a wiring pattern of each net and a design rule which includes a constraint condition of said wiring pattern; and a screening processing unit which generates error information about an error in said each net for each combination of design rule check items and operating frequencies of said each net based on a result of said design rule check and outputs said error information to an indicating device;

wherein said medium stores a program which makes said computer carry out processing of outputting error list data of nets which have become an error about a selected combination of check items of said design rule and operating frequencies of said each net;

wherein said medium stores a program which makes said computer carry out processing of selecting a combination of check items of said design rule and operating frequencies of said each net based on error selection default information which indicates a combination with a high priority of error correction among combinations of check items of said design rule and operating frequencies of said each net;

wherein said error selection default information is a combination with a high effect of EMI reduction among combinations of check items of said design rule and operating frequencies of said each net.

* * * * *